April 3, 1962     G. J. ANGSTADT     3,028,043
EXPENDABLE SHIPPING CONTAINER AND BABY FOOD JAR HOLDER
Filed March 27, 1961
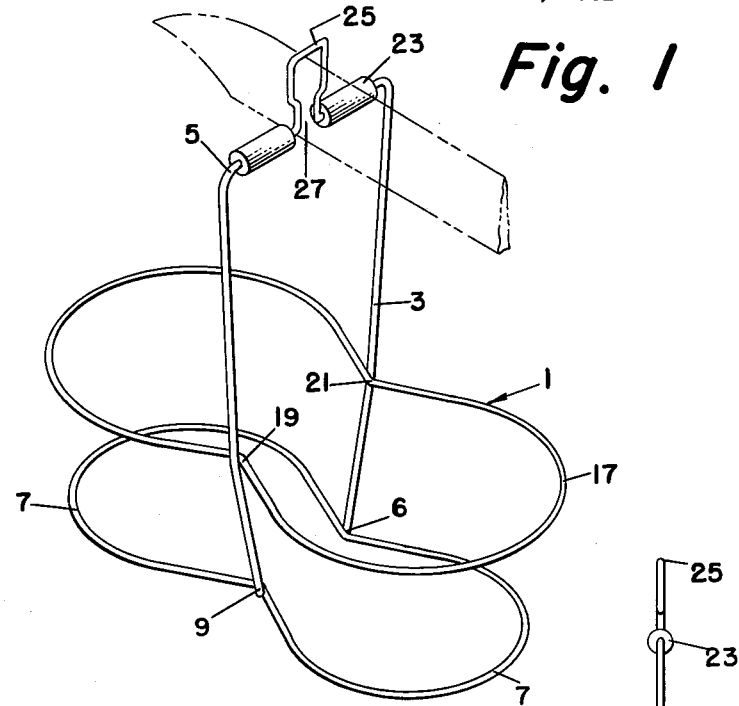
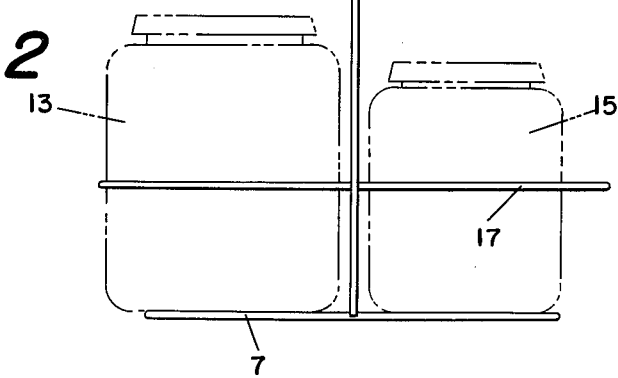
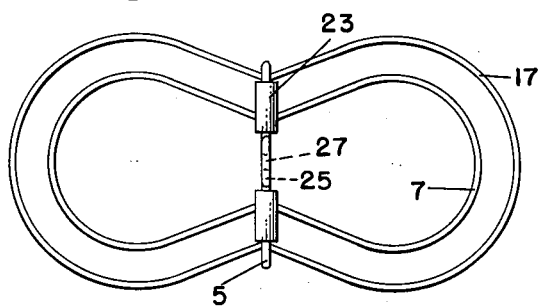
INVENTOR.
GLENN J. ANGSTADT

United States Patent Office 3,028,043
Patented Apr. 3, 1962

3,028,043
EXPENDABLE SHIPPING CONTAINER AND BABY FOOD JAR HOLDER
Glenn J. Angstadt, 441 E. Woodland Ave., Springfield, Pa.
Filed Mar. 27, 1961, Ser. No. 98,714
2 Claims. (Cl. 220—102)

The invention relates to a disposable shipping container for jars and more particularly to a container which is able to be adapted to simultaneously support two baby food jars in a pan of hot water.

It is presently the practice to feed young infants with food which has been previously prepared and afterwards vacuum sealed into small jars. The food is warmed by setting the jars into a pan of hot water. An infant's formula usually prescribes a meat and a vegetable, each of which is packed into a separate jar. Therefore, it is necessary to warm two jars at one time. Formerly, these heated jars had to be lifted from the pan by hand oftentimes resulting in the hands being burned. It was difficult to employ tongs or other like means since the jars would slip from their grasp and drop to the floor.

Therefore, an object of the invention is to provide an improved holding device, which serves as a twin pack shipping container for jars of baby food, which will support two jars of varying size in a pan of hot water, which will enable the jars to be easily lifted from the water, which will function as a serving tray enabling the food to be eaten directly from the jars, and which will enable the jars to be easily stored in a refrigerator or the like.

Another object of the invention is to provide an improved baby food rack which will be relatively simple, compact, convenient, practical and inexpensive.

Various other objects and advantages will be apparent from the following description of one embodiment of the invention, and the novel features will be particularly pointed out hereinafter in connection with the appended claims.

In the accompanying drawing:

FIGURE 1 is an isometric of the device showing a knife-edge in phantom;

FIGURE 2 is a side elevational view of the device showing two jars in position;

FIGURE 3 is a top plan view of the device;

Similar numerals refer to similar parts throughout the drawings.

Referring to FIGURE 1, the shipping container or holder 1 consists of a U-shaped member 3 which may be formed of wire and functions as the main support for the device.

A pair of spring wire hoop or loop members 7 are rigidly fastened to each side of the U member at its base preferably by welding or soldering at points 9 and 6 for supporting the bottom of the jars 13 and 15 (FIG. 2) when placed in the holder.

A second pair of spring wire hoop or loop members 17 is connected between the sides of the U member 3 intermediate between the top 5 and the loop member 7 preferably by soldering or welding at points 19 and 21. This second pair of loops 17 is sized to allow the jars 13 and 15 to slip therethrough so that the jars are supported around their periphery in juxtaposition to each other.

Both the loop member 7 and the loop member 17 are pinched or squeezed prior to being fastened to the U member 3 to form a narrow or neck portion at points 9 and 6 and at points 19 and 21 respectively. This prevents the jars from falling over on their sides, and permits a more rigid support when two jars of unequal size are placed in the holder.

The top 5 of the U member is covered with asbestos 23 or the like to prevent the hands from being burned when the holder is lifted from a pan of hot water.

The holder may include the I-shaped handle 25 which has a narrow groove 27 integral with the top 5 of the U member 3. A knife edge or the like, shown in phantom (FIG. 1), can be slipped through the groove 27 where by it engages the handle 25 so as to enable the holder to be lifted out from the pan of water without having to grasp the top 5 of U member 3.

It will be obvious that changes in the size, dimensions, proportions, and minor details may be resorted to without in the least departing from the spirit of the invention.

The invention in its broader aspects is not limited to the specific apparatus shown and described but departures may be made therefrom within the scope of the accompanying claims without departing from the principles of the invention and without sacrificing its chief advantages.

What is claimed is:

1. A holder for supporting two jars in a pan of hot water, said holder comprising a wire-like U member having an opening in the base thereof, the arms of said U member being disposed in substantially vertical alignment; a first pair of oppositely disposed loops having a neck portion rigidly connected to the base of said U member for engagement with the bottoms of the jars; a second pair of oppositely disposed loops having a neck portion rigidly connected between the arms of the said U member intermediate the top and the base thereof, the said second pair of loops being sized to receive the jars therethrough whereby the jars are supported around their periphery in juxtaposition to each other; a substantially I-shaped member having a narrow groove at the bottom thereof and being integral with the top of the said U member whereby a knife-edge may be squeezed into the groove whereby the holder is lifted from the pan of hot water.

2. A holder for supporting two jars in a pan of hot water, said holder comprising a wire-like U member having an opening in the base thereof, the arms of said U member being disposed in substantially vertical alignment; a first pair of oppositely disposed loops having a neck portion rigidly connected to the base of said U member for engagement with the bottoms of the jars; a second pair of oppositely disposed loops having a neck portion rigidly connected between the arms of the said U member intermediate the top and the base thereof, the said second pair of loops being sized to receive the jars therethrough whereby the jars are supported around their periphery in juxtaposition to each other; a substantially I-shaped member having a narrow groove at the bottom thereof and being integral with the top of the said U member; insulating means wrapped around the top of the U shaped member whereby the said insulating means may be grasped to lift the holder from the pan of hot water.

References Cited in the file of this patent

UNITED STATES PATENTS

| | | |
|---|---|---|
| 446,190 | Post | Feb. 10, 1891 |
| 2,191,693 | Havlis | Feb. 27, 1940 |
| 2,606,702 | Chapman | Aug. 12, 1952 |
| 2,797,013 | Powell | June 25, 1957 |
| 2,827,198 | Parks | Mar. 18, 1958 |